(12) United States Patent
Shemla et al.

(10) Patent No.: US 6,738,838 B2
(45) Date of Patent: May 18, 2004

(54) NETWORK SWITCH HAVING DESCRIPTOR CACHE AND METHOD THEREOF

(75) Inventors: David Shemla, Kfar Havradim (IL); Rami Rozensvaig, Kiryat Motzkin (IL)

(73) Assignee: Marvell International, Ltd., Hamilton (BM)

( * ) Notice: Subject to any disclaimer, the term of this patent is extended or adjusted under 35 U.S.C. 154(b) by 0 days.

(21) Appl. No.: 10/456,767

(22) Filed: Jun. 6, 2003

(65) Prior Publication Data

US 2003/0200367 A1 Oct. 23, 2003

Related U.S. Application Data

(63) Continuation of application No. 09/360,980, filed on Jul. 26, 1999, now Pat. No. 6,601,116.

(30) Foreign Application Priority Data

Jul. 26, 1998 (IL) ................................................ 125515

(51) Int. Cl.[7] ................................................ G06F 13/00
(52) U.S. Cl. ........................................... 710/38; 710/29
(58) Field of Search ............................... 710/29, 33–35, 710/52–61, 2–24; 709/212–213; 370/412

(56) References Cited

U.S. PATENT DOCUMENTS

| 5,261,059 A | 11/1993 | Hedberg et al. |
| 5,606,665 A | 2/1997 | Yang et al. |
| 5,644,784 A | 7/1997 | Peek |
| 5,793,953 A | 8/1998 | Yeung et al. |
| 5,828,901 A | 10/1998 | O'Toole et al. |
| 5,870,627 A | 2/1999 | O'Toole et al. |
| 5,948,079 A | 9/1999 | Tsai et al. |
| 6,049,842 A | 4/2000 | Garrett et al. |
| 6,064,676 A | 5/2000 | Slattery et al. |
| 6,070,194 A | 5/2000 | Yu et al. |
| 6,163,820 A | 12/2000 | Garrett et al. |
| 6,182,164 B1 | 1/2001 | Williams |
| 6,195,368 B1 | 2/2001 | Gratacap |
| 6,199,124 B1 | 3/2001 | Ramakrishnan et al. |
| 6,272,564 B1 | 8/2001 | Garrett et al. |
| 6,292,490 B1 | 9/2001 | Gratacap et al. |
| 6,327,615 B1 | 12/2001 | Kasper |
| 6,334,162 B1 | 12/2001 | Garrett et al. |
| 6,338,102 B1 | 1/2002 | Garrett et al. |
| 6,438,613 B1 | 8/2002 | Yeung et al. |

Primary Examiner—Christopher B. Shin

(57) ABSTRACT

A device for writing descriptors, the device including a local memory comprising a multiplicity of mini-queues, wherein each of the mini-queues temporarily stores a plurality of descriptors, wherein each of the descriptors is associated with one of the data packets. Additionally including an output memory comprising a multiplicity of output queues, wherein each of the output queues in output memory is associated with one of the queues in said local memory, and a burst writer which writes N descriptors simultaneously from the mini-queue in the local memory to its associated output queue in output memory.

15 Claims, 2 Drawing Sheets

NETWORK SWITCH HAVING DESCRIPTOR CACHE AND METHOD THEREOF

CROSS-REFERENCE TO RELATED APPLICATIONS

This application is a continuation of U.S. Non-Provisional Patent Application Ser. No. 09/360,980 entitled "A Network Switch Having Descriptor Cache And Method Thereof," filed Jul. 26, 1999, now U.S. Pat. No. 6,601,116 the disclosure thereof incorporated by reference herein in its entirety.

BACKGROUND

The present invention relates generally to network switching communication protocols and in particular to the writing of descriptors.

A network switch creates a network among a plurality of end nodes, such as workstations, and other network switches connected thereto. Each end node is connected to one port of the network. The ports also serve to connect network switches together.

Each end node sends packets of data to the network switch which the switch then routes either to another of the end nodes connected thereto or to a network switch to which the destination end node is connected. In the latter case, the receiving network switch routes the packet to the destination end node.

Each network switch has to temporarily store the packets of data which it receives from the units (end node or network switch) connected to it while the switch determines how, when and through which port to retransmit the packets. Each packet can be transmitted to only one destination address (a "unicast" packet) or to more than one unit (a "multicast" or "broadcast" packet). For multicast and broadcast packets, the switch typically stores the packet only once and transmits multiple copies of the packet to some (multicast) or all (broadcast) of its ports. Once the packet has been transmitted to all of its destinations, it can be removed from the memory or written over.

Reference is now made to FIG. 1 which schematically illustrates a portion of the data packet transfer process that takes place within a network switch 10.

Switch 10 comprises a first memory 12 and a second memory 14, both of which are general function memories used to store data temporarily. Memory 14 is a random access memory and holds a plurality of data packets 16.

Memory 12 is a set of first-in-first-out (FIFOs) memories and comprises a multiplicity Q of output queues 18, each of which hold a plurality of descriptors 20. Each output queue 18 is dedicated to an associated end node.

Descriptors 20 are records which describe data packets 16; the description includes information such as buffer location, length of packet, transmitting information, etc. Descriptors 20 are unique per each associated data packet 16.

When a unicast data packet 16 is written into memory 14, one associated descriptor 20 is written into memory 12. When a multicast data packet 16 is written into memory 14, N descriptors 20 are written into memory 12, where N is the number of recipients of the multicast packet. Each of the N descriptors 20 is written into the appropriate output queue 18 for the designated end node.

The output queues 18 define the order with which the data packets will be written out, such that the descriptors 20 at the output end of each queue defines the next data packet to be transmitted.

Unfortunately accessing memory is time-consuming. To write each short descriptor into its appropriate output queue or queues requires multiple memory clock cycles, per write. This affects the overall speed of the network switch 10.

SUMMARY

It is an object of the present invention to provide an faster method for writing descriptors than is found in the prior art.

There is therefore provided in accordance with a preferred embodiment of the present invention a method of writing descriptors, including the steps of writing into a local memory, wherein the local memory comprises a multiplicity of mini-queues, each mini-queue storing a plurality of descriptors, wherein each of the descriptors is associated with one of the data packets; accumulating the descriptors in the multiplicity of mini-queues; and transferring more than one of the descriptors from the multiplicity of queues to an output memory comprising a multiplicity of output queues, wherein each of the output queues in output memory is associated with one mini-queue in local memory.

There is therefore provided in accordance with a preferred embodiment of the present invention a device for writing descriptors, the device including a local memory comprising a multiplicity of mini-queues, wherein each of the mini-queues temporarily stores a plurality of descriptors, wherein each of the descriptors is associated with one of the data packets; and an output memory comprising a multiplicity of output queues, wherein each of the output queues in output memory is associated with one of the queues in said local memory, and a burst writer which writes N descriptors simultaneously from the mini-queue in the local memory to its associated output queue in output memory.

DESCRIPTION OF DRAWINGS

The present invention will be understood and appreciated more fully from the following detailed description taken in conjunction with the drawings in which.

DETAILED DESCRIPTION

Figure 1:
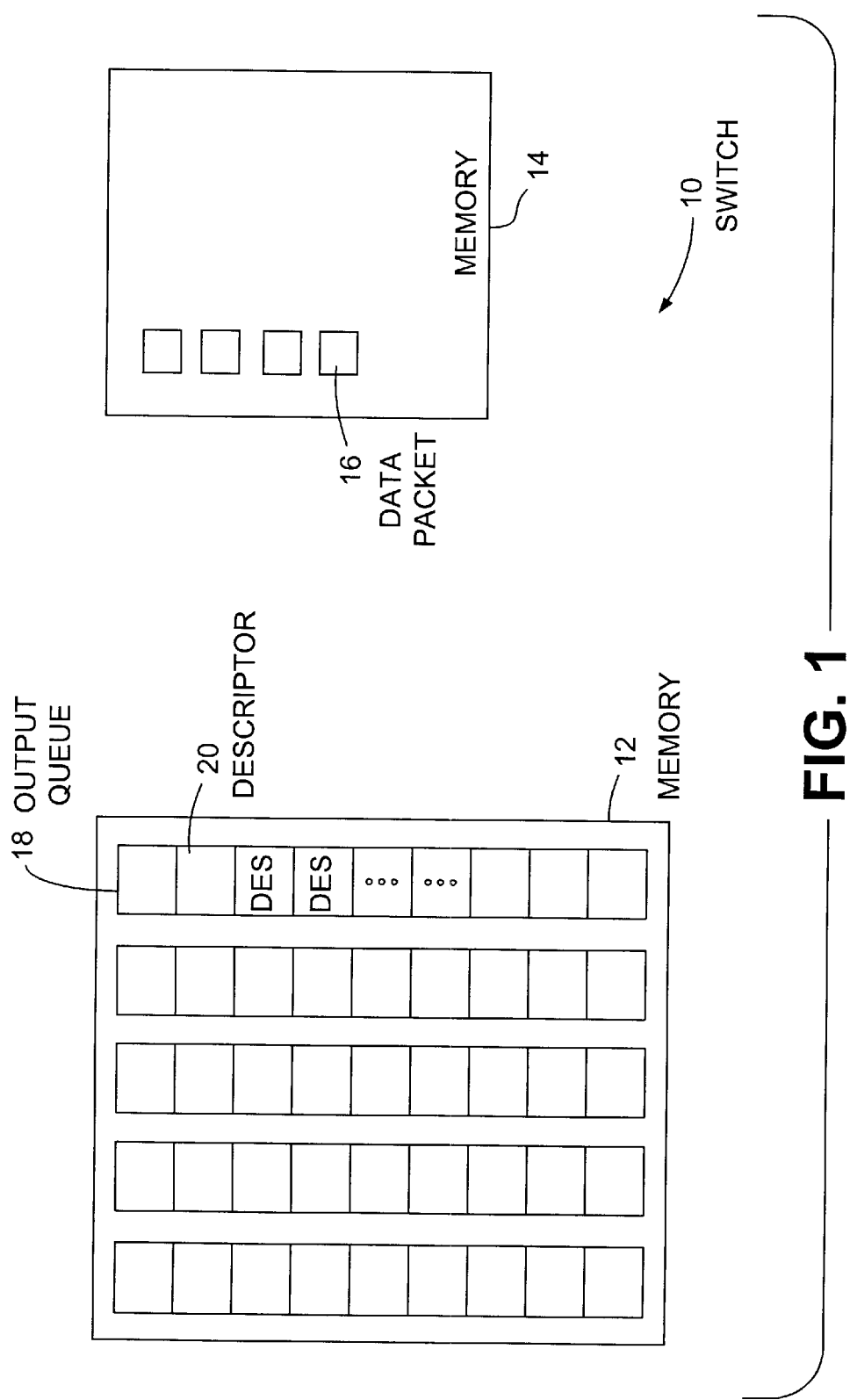
FIG. 1 is a block diagram illustration of a prior art switch memory structure.
Figure 2:
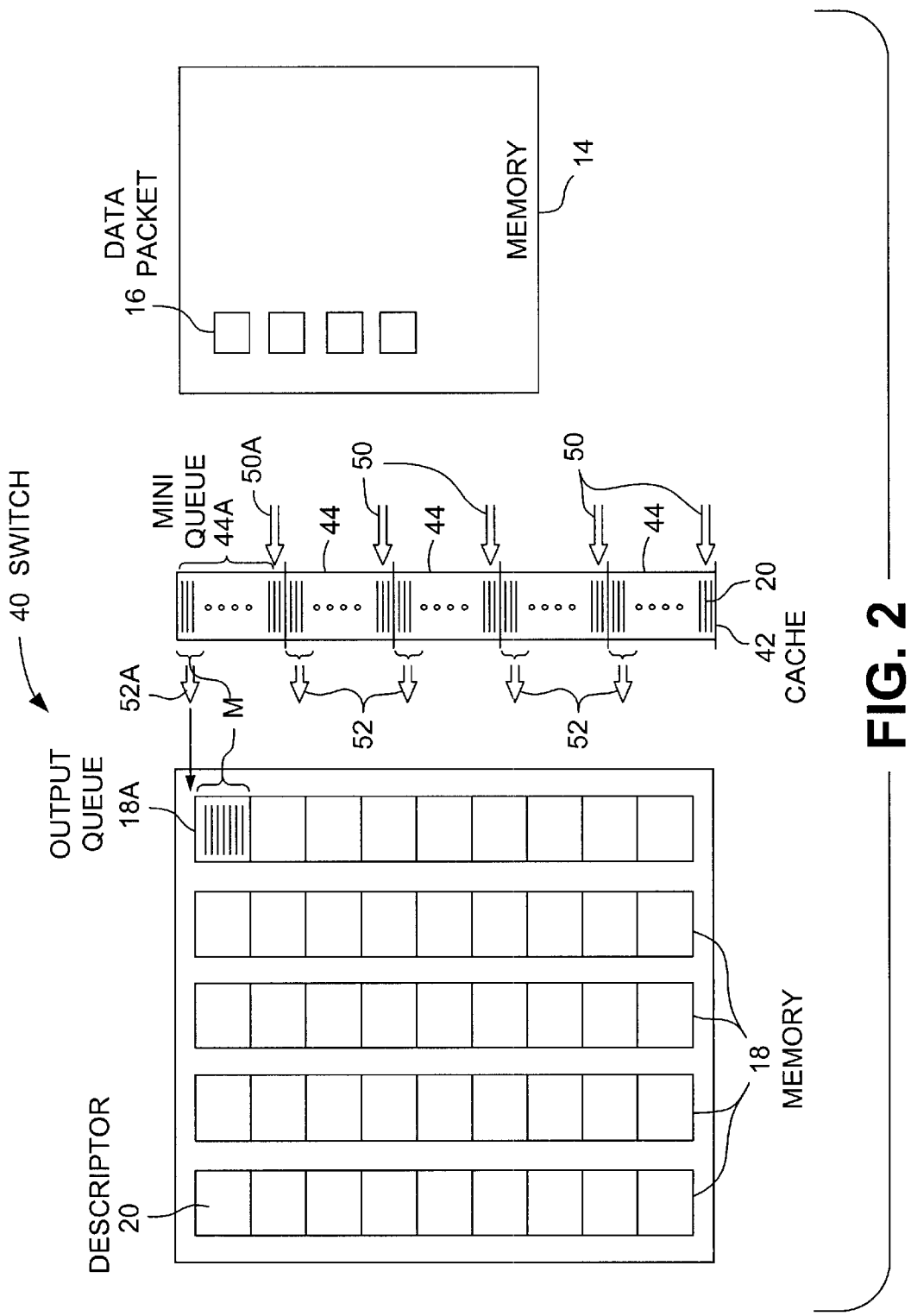
FIG. 2 is a block diagram illustration of a switch memory structure, constructed and operative in accordance with a preferred embodiment of the present invention.

Reference is now made to FIG. 2, which illustrates, in general terms a network switch 40, constructed and operative in accordance with a preferred embodiment of the present invention, and a portion of the data packet transfer process that takes place within network switch 40. Elements of the invention which are similar to those previously described and illustrated in FIG. 1 are similarly designated and function similarly.

Switch 40 comprises first memory 12, and second memory 14, as in the prior art, and in addition, switch 40 comprises a cache 42. As in the prior art, memory 14 holds a plurality of data packets 16 and memory 12 comprises a multiplicity Q of output queues 18. In the present invention, output queues 18 and cache 42 hold descriptors 20.

Cache 42 is a local fast memory such as SRAM, which functions as a temporary storing facility for groups of descriptors 20. When a data packet 16 is written into memory 14, its associated descriptor 20 is first written into the appropriate location in cache 42, and from there into queue 18 of memory 12.

Cache 42 comprises a multiplicity Q of FIFO mini-queues 44. Each mini-queue 44 holds P descriptors 20 and is associated with a queue 18. The P descriptors are first written into mini-queues 44, and then written in a first-in-first-out fashion into the associated queues 18.

In accordance with a preferred embodiment of the present invention, groups of M descriptors 20 are written into memory 12 in bursts. Hence, memory 12 is accessed only once for every M descriptors 20, thus reducing expensive memory access time.

When a data packet 16 is written into memory 14, an associated descriptor 20 is written into one of the mini-queues 44, as illustrated by arrows 50. Descriptors 20 accumulate in mini-queues 44. As soon as the memory 12 is available, descriptors 20 from mini-queues 44 are written into queues 18. However, since memory 12 generally busy, it is likely that by the time memory 12 access is available, several descriptors 20 have already accumulated in the mini-queue 44, and such they are written in one burst from the mini-queue 44 to the associated queue 18. After one mini-queue 44 is accessed and written from, the next-mini-queue 44 in line is served, in round robin fashion.

In a preferred embodiment, a request from mini-queues 44 to write into memory 12 is issued as soon as a descriptor 20 is written into the mini-queue 44. However, since memory 12 is generally busy, by the time access to memory 12 is granted, frequently a plurality of descriptors 20 have accumulated, and as such they are written in a burst into memory 12, and thus memory access time utilization is improved.

When M descriptors 20 have accumulated, they are written as a group into the associated queue 18, as illustrated by arrows 52.

In exemplary situation, as illustrated in FIG. 2 by arrows 50A and 52A, respectively, descriptors 20 are first written into mini-queue 44A, and from there, bursts of M descriptors 20 are written into queue 18A.

While the size of M may vary, in a preferred embodiment M is between 4 and 8 descriptors 20. Additionally, generally the descriptors 20 which have been in queue 44 the longest are the first ones to be written into queues 18, hence the burst write functions in generally a first-in first-out manner; the first descriptors 20 to be written into queues 44 are generally the first descriptors to be written into queue 18.

It will be appreciated that the burst write reduces the number of accesses into queue memory 12 and thus, increases the speed of operation of the switch 40.

What is claimed is:

1. A device comprising:
    a data memory to store a plurality of data;
    a cache memory comprising a plurality of FIFO mini-queues each of said plurality of mini-queues to store a plurality of descriptors, each of the plurality of descriptors corresponding to a respective one of said plurality of data;
    an output memory comprising a plurality of output queues; and
    a burst writer to simultaneously transfer M ones of the plurality of descriptors stored in a corresponding one of said plurality of mini-queues to at least a corresponding one of said plurality of output queues,
    wherein said burst writer accesses said output memory, when said output memory is available, once for every M ones of the plurality of descriptors.

2. A device according to claim 1, wherein other ones of said plurality of FIFO mini-queues are accessed in a round robin fashion.

3. A device according to claim 1, wherein oldest ones the plurality of descriptors stored in said cache memory are transferred to said output memory prior to younger ones of the plurality of descriptors.

4. A device according to claim 1, wherein said cache memory is a fast memory.

5. A device according to claim 1, wherein said cache memory is SRAM.

6. A method of writing descriptors, comprising the steps of:
    writing a plurality of data into a data memory;
    writing a plurality of descriptors into at least one of a plurality of mini-queues of a cache memory, each of the plurality of descriptors corresponding to a respective one of said plurality of data;
    accumulating said descriptors in said plurality of mini-queues;
    simultaneously transferring M ones of the plurality of descriptors stored in a corresponding one of said plurality of mini-queues to at least a corresponding one of a plurality of output queues; and
    accessing the output memory, when the output memory is available, once for every M ones of the plurality of descriptors.

7. A method according to claim 6, further comprising the step of accessing other ones of the plurality of FIFO mini-queues in a round robin fashion.

8. A method according to claim 6, further comprising the step of transferring ones the plurality of descriptors stored in the cache memory are transferred to the output memory prior to younger ones of the plurality of descriptors.

9. A method according to claim 6, wherein the cache memory is a fast memory.

10. A method according to claim 6, wherein the cache memory is SRAM.

11. A device comprising:
    memory means for storing a plurality of data;
    cache memory means comprising a plurality of FIFO mini-queue means each of said plurality of mini-queue means for storing a plurality of descriptors, each of the plurality of descriptors corresponding to a respective one of said plurality of data;
    output memory means comprising a plurality of output queue means for storing corresponding ones of the plurality of descriptors; and
    burst writer means for simultaneously transferring M ones of the plurality of descriptors stored in a corresponding one of said plurality of mini-queue means to at least a corresponding one of said plurality of output queue means,
    wherein said burst writer means accesses said output memory means, when said output memory means is available, once for every M ones of the plurality of descriptors.

12. A device according to claim 11, wherein other ones of said plurality of FIFO mini-queue means are accessed in a round robin fashion.

13. A device according to claim 11, wherein oldest ones the plurality of descriptors stored in said cache memory means are transferred to said output memory means prior to younger ones of the plurality of descriptors.

14. A device according to claim 11, wherein said cache memory means is a fast memory.

15. A device according to claim 11, wherein said cache memory means is SRAM.

* * * * *